United States Patent [19]
Greever

[11] 3,817,210

[45] June 18, 1974

[54] APPARATUS FOR COATING THE INTERIOR END PORTION OF A TUBE JOINT

[75] Inventor: James E. Greever, Dewitt, N.Y.

[73] Assignee: Carrier Corporation, Syracuse, N.Y.

[22] Filed: Mar. 3, 1972

[21] Appl. No.: 231,680

Related U.S. Application Data

[63] Continuation of Ser. No. 825,662, May 19, 1969, abandoned.

[52] U.S. Cl............................ 118/408, 156/285
[51] Int. Cl..................... B05b 13/06, B05c 5/02
[58] Field of Search............. 118/408, 105, DIG. 10; 156/294, 423, 285

[56] References Cited
UNITED STATES PATENTS
2,974,367  3/1961  Doering et al................. 156/423 X
3,498,866  3/1970  Kilbane............................ 156/294

Primary Examiner—Louis K. Rimrodt
Attorney, Agent, or Firm—J. Raymond Curtin

[57] ABSTRACT

The present invention is directed to the bonding of tube joints exemplified by the securement of bell and spigot tube ends on plate fin or spiral fin coil units employed in refrigeration apparatus, the bonding process being characterized in part by accurate metering of a predetermined quantity of a thermosetting structural adhesive to particular locations on the mating tube joint members and productive of an extremely high strength bond therebetween resistive to deterioration after long exposure to normal environmental conditions.

1 Claim, 5 Drawing Figures

INVENTOR.
JAMES E. GREEVER.

BY
B. H. Claeboe
ATTORNEY.

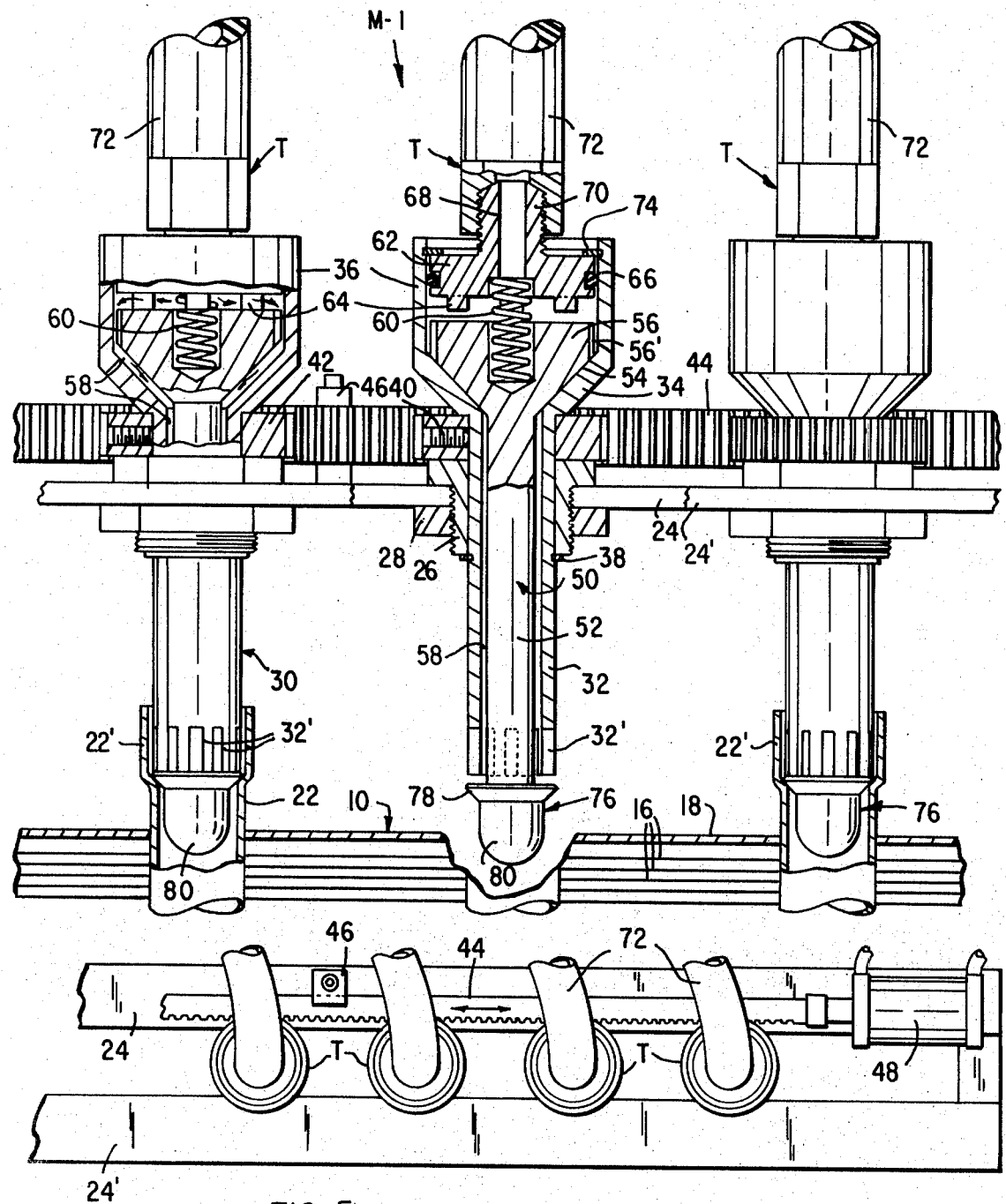

3,817,210

APPARATUS FOR COATING THE INTERIOR END PORTION OF A TUBE JOINT

This is a continuation, of U.S. Pat. application Ser. No. 825,662 filed May 19, 1969 now abandoned.

BACKGROUND OF THE INVENTION

It is known in the art to which this invention pertains to utilize zinc soldering, phos-copper brazing or like techniques to firmly secure bell and spigot members one to the other to provide the return bend circuitry for the flow of a heat exchange fluid in plate fin, spiral fin and other coil units employed in refrigeration apparatus. While zinc soldering has much in its favor, when applied to aluminum tubing which is exposed to a damp atmosphere for a substantial period of time, ultimate attack on the joint may result with the possibility of leakage in the joint. It has accordingly been proposed to effect a bond between the two joint members by use of thermosetting adhesives by applying the adhesive to one end of one of the joint members, assemble the members in interfitting relation, and draw a vacuum through the assembled tube parts in an endeavor to cause plastic flow into intimate contact with the mating parts. Generally speaking, this technique has not enjoyed complete commercial success since voids were found in the joint and fatigue and tensile strength requirements could not readily be met. In other instances, an excessive amount of adhesive was often applied to one of the members of the joint, and when vacuum was drawn, some of the adhesive would be sucked beyond the joint and into one of the tubes, impairing its heat exchange efficiency. Persons skilled in the art can well recognize other objections to the technique just described.

SUMMARY OF THE INVENTION

The present invention is particularly directed to refrigeration apparatus which incorporates therein a heat exchanger comprised of a plurality of spaced coil fins mounted upon coil tubes connected by return bends. The coil tubes have flared mouth portions termed in the art as bell ends while the interfitting return bend portion is known as a spigot end. A reverse arrangement could of course be used in which the spigot end or return bend is of greater diameter than the other mating tube portion, and an adhesive bond effected therebetween. In accordance with this invention, there is provided between the bell and spigot ends a plastic-to-metal bond characterized by high resistance to environmental attack and exceptional tensile strength and fatigue properties achieved by carefully controlled application of a single solution epoxy adhesive in metered quantities to predetermined locations on both the bell and spigot joint members, followed by assembly and heat curing at an exemplary temperature of 250° F for up to about 2 hours. The adhesive may be hand applied by a suitable applicator tool actuated by air pressure, or in a semi-automatic production operation employing the exemplary apparatus disclosed herein. In any event, it is important that both the bell and spigot ends be coated, the quantity of adhesive be carefully metered, only particular locations on the tube ends be coated, the sizing and location of the adhesive discharge openings in the applicator tool be preselected, and the adhesively coated surfaces of the tube ends be wiped to avoid the creation of air voids therein.

BRIEF DESCRIPTION OF THE DRAWINGS

FIGS. 3 and 4 are side elevational views, with portions thereof being in section, showing exemplary apparatus which may be utilized to practice the novel concepts of this invention; and FIG. 5 is a top plan view of the apparatus of FIG. 4.

DESCRIPTION OF THE PREFERRED EMBODIMENT

Figure 1:
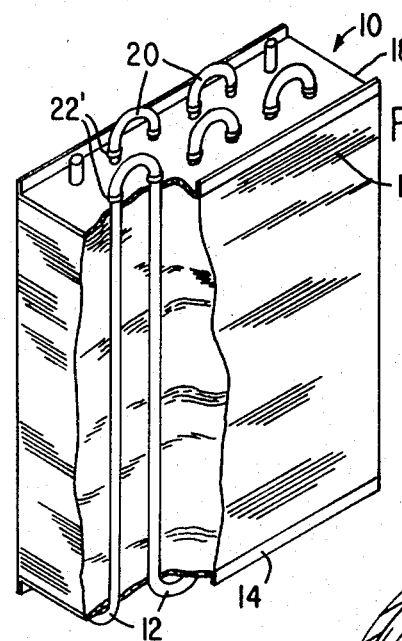
FIG. 1 is an elevational view of a heat transfer coil to which the instant invention may be applied, a portion thereof having been broken away to better show the tube and fin structure.

While it will be manifest as the description proceeds that the present invention has numerous applications, particularly satisfactory results have been achieved when it is applied to the production of heat transfer coils of the character shown in FIG. 1, whether they be used as condensers or evaporators or be of the plate fin or spiral fin coil type. As appears, a typical coil 10 comprises a plurality of generally U-shaped tubes 12, also referred to in the art as "hairpins," which extend vertically upwardly through a perforate bottom tube sheet 14 and support a plurality of vertically spaced and horizontally disposed apertured fins 16. The upper ends of the tubes 12 receive thereon a perforate upper tube sheet 18, and connecting the tubes are substantially U-shaped return bends or spigots 20, thereby providing a continuous fluid flow path through the tube arrangement. As is known, by utilizing suitable fixtures, the lower tube sheet 14 and tubes 12 are assembled, the plate fins 16 stacked upon the tubes in vertically spaced relation, the top tube sheet 18 placed upon the upper ends of the tubes, the tubes then expanded into firm contact with the fins and tube sheets, the tube ends flared as shown, and the return bends 20 fixedly joined thereto.

Figure 2:
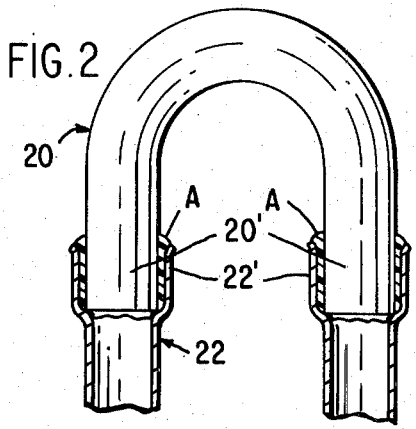
FIG. 2 is a fragmentary view, taken partially in section, showing a typical bonded bell and spigot joint as produced by this invention.

The tube ends after flaring present substantially the appearance shown in FIG. 2, each of the tube ends including an upwardly and outwardly directed mouth portion 22', referred to herein as a bell end, receiving in interfitting relation one leg 20' of a lesser diameter return bend or spigot 20. It is to be seen from FIG. 2 that bonding the depending leg portion 20' of return bend 20 and flared mouth portion 22' of tube end 22 one to the other is adhesive A. The adhesive is a one-part or one solution, 100 percent solids epoxy having a non-sag paste viscosity with good filleting properties which provides dense, void-free cured bonds when applied by this invention, and is characterized further by high strength properties over a wide range of service temperatures and excellent retention of strength after aging. Epoxies or other thermosetting structural adhesives can be readily formulated so as to meet the foregoing properties; however, it is essential in the application of the resin that it be applied in accurately metered quantities to the precise joint locations desired so that it assumes the shape of an annulus or collar as shown in FIG. 2 and does not significantly flow or ooze beyond the juncture of return bend leg portion 20' and tube end mouth portion 22' upon assembly of the parts. Should that take place, not only would an inferior bond be produced, but quite likely the heat transfer effectiveness of the coil unit would be impaired.

Figure 3:
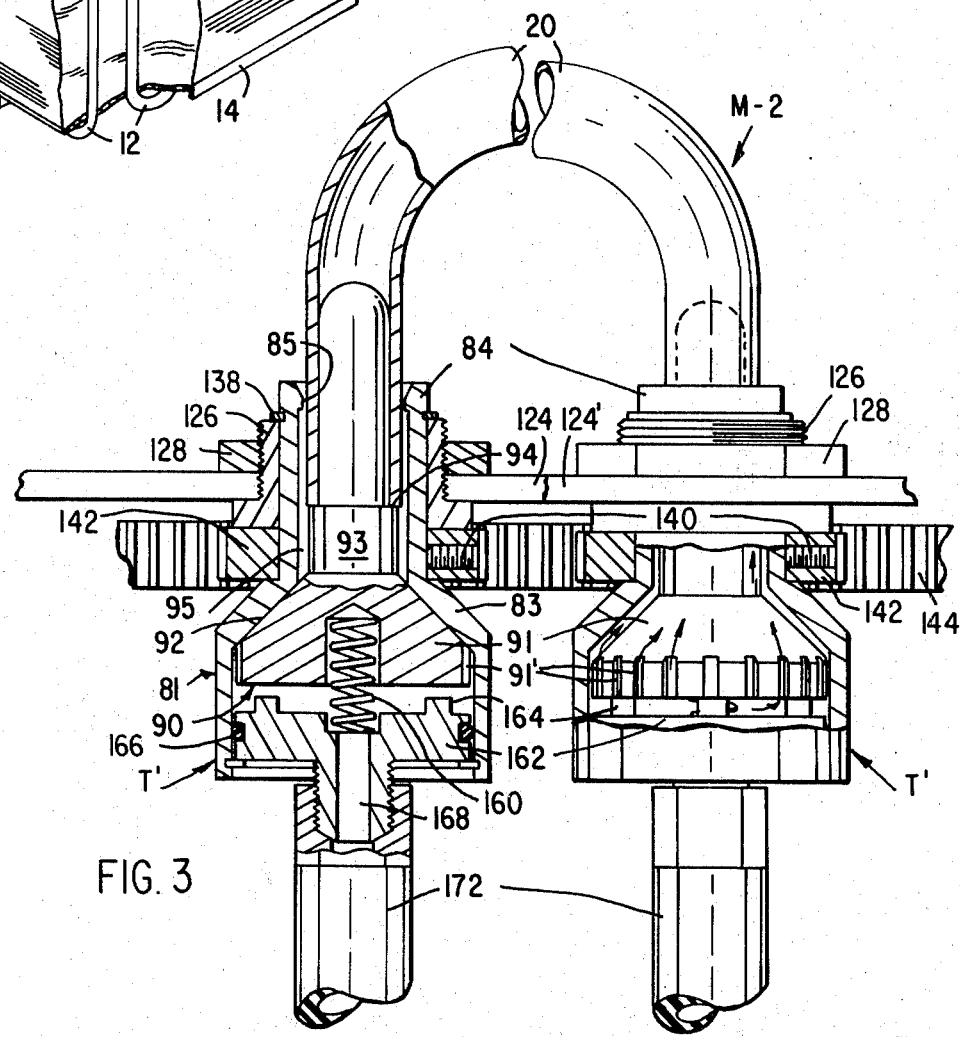

Experience has demonstrated that in order to achieve the highly tenacious bond desired, adhesive should be applied to both of the mating tube parts, and exemplary apparatus effective for this purpose is illustrated in FIGS. 3, 4 and 5. With reference first to the latter two views, mechanism for applying adhesive to the interior of the flared mouth portion 22' of tube end 22 is designated generally therein by the legend M–1. The internal applicator mechanism M–1 may be equipped for semi-automatic operation with a plurality of essentially identical applicator tools T, the principal difference therebetween shown in FIG. 4 being that the outermost tools are in the position of adhesive application, while the center tool is separated from the bell end after application of adhesive thereto.

The mechanism M–1 includes a pair of spaced supporting frame members 24 and 24' receiving therebetween a collar member 26 engaged by nut means 28 to provide a horizontally adjustable mounting for the tools T. Each of the collar members mounts therein a tubular tool housing 30 formed to provide a shank portion 32 from which extends a divergent collar portion 34 and upstanding open-ended head portion 36. If desired, the collar member 26 may be held in position with respect to the housing shank portion 32 by retaining means 38. The shank portion 32 of the tool housing has secured thereto by a set screw or like means 40 a pinion gear 42 meshing with rack gear means 44 guided by means 46 attached to frame member 24 and reciprocably movable under action of actuating means 48, which may also be mounted on the frame member 24.

It is to be seen that the lower end of the shank portion 32 of the housing is provided with a plurality of circumferentially spaced adhesive discharge slots 32', the number, width and length of course depending generally upon the internal diameter of the bell end being coated. However, a sufficient number of slots should be formed to assure good uniform distribution of adhesive throughout the internal surfaces of the bell and spigot joint, and principally for this reason slots are presently preferred over holes or rounded openings.

Received within the housing member 30 is a generally complimentarily contoured metering member 50 provided with a shank portion 52 integral with a sloping or upwardly divergent shoulder portion 54 which terminates in a head portion 56 provided along its circumference with a plurality of equally spaced slots 56', which as is shown in the left hand portion of FIG. 4, communicate at their lower ends with an adhesive flow cavity 58 terminating in the slots 32' in the housing member 32. The head portion 56 of metering member 50 is formed generally centrally with a cavity which receives therein spring means 60 bearing at its opposite end against a stationary plug member 62 provided with a plurality of circumferentially spaced depending lugs 64 which provide therebetween, during the adhesive application operation, communication with the adhesive source and the slots 56' in the metering member head portion 56. Since the plug member 62 and housing member 30 rotate slightly relative to one another by action of the gears 42 and 44 and actuating means 48, to assure adequate wiping of adhesive on the interior surface of the bell end 22 and thereby avoiding the creation of air voids, an O-ring 66 may be located as shown.

The plug member 62 is centrally passaged at 68 to provide through threaded neck portion 70 an adhesive flow path from applicator nozzle means 72 communicating with an adhesive source and air supply, both of which are not shown in full detail. As mentioned, the plug member 62 is essentially stationary, being connected to the adhesive source and air supply; however, if desired, retaining means 74 can provide further restraint against upward movement of the plug member.

At its opposite end the metering member 50 has threaded into or otherwise secured to the shank portion 52 thereof an adhesive flow control member 76 which assures that during injection of the adhesive there will be no leakage or flow beyond the flared mouth 22' of tube end 22 and into the main portion of the tube section. For this purpose, the flow control member 76 is formed with a flared or dished collar portion 78 sized and contoured to precisely mate with the inner surface of the flared end 22' of the tube end, as appears in the left hand view of FIG. 4. The member 76 below the collar 78 terminates in a nose portion 80 for guiding the metering member shank relative to the tube end 22.

Referring now to FIG. 3, which will be described before giving a brief explanation of operation of mechanism M–1 of FIGS. 4 and 5, since both mechanisms operate in a generally similar manner, there is designated by the legend M–2 mechanism for applying adhesive to the outer surfaces of return bend 20 and particularly leg portion 20' thereof. However, as was earlier indicated, the spigot end 20 may be successfully coated by using a hand applicator tool provided that the controls referred to herein are practiced. That is, the quantity of adhesive applied must be accurately metered, care must be exercized to assure that the adhesive coats only predetermined locations on the spigot end, and in order to avoid the formation of air voids, it is highly desirable that the plastic be wiped after application to the tube end.

It will be noted upon a comparison of FIGS. 3 and 4 that the internal and external mechanisms shown have essentially common parts, with the exception of the configurations of the metering and housing members. Accordingly, parts in FIG. 3 generally like those shown in FIG. 4, and described in connection therewith, are designated in FIG. 3 raised by the numeral "100."

Housing member 81 in FIG. 3 is formed with a skirt portion 82 integral with an inwardly directed shoulder portion 83 merging into a tubular shank portion 84 provided along its inner diameter adjacent its extreme end with an annular bead 85 for controlling the extent of adhesive flow. Metering member 90, on the other hand, is shaped to provide a base portion 91 slotted circumferentially as at 91' and also having a tapered shoulder portion 92 integral with a shank portion 93 having a stepped ledge 94 formed thereon. By so contouring the housing and metering members 81 and 90, during application of adhesive the plastic material flows under action of air pressure through applicator nozzle 172, passage 168 in plug member 162 and between lugs 164 on the plug, through slots 91' in the base of the metering member, and along passage 95 between the metering and housing members to bead 85, thereby coating only a predetermined portion of the leg 20' of the spigot end or return bend 20. When the desired quantity of adhesive has been applied, as may be determined by noting a slight oozing or puddling in the region of the bead 85, vertical movement of the mechanism M-2 relative to the spigot joint 20, as by simply lifting the return bend 20, causes the metering member 90 to stop adhesive flow by its sealing contact with the housing member shoulder portion 83.

In the external applicator mechanism M-2 of FIG. 3, supporting plate means 124 upon which tools T' are mounted may be either vertically movable or immovable, and if immovable upwardly and downwardly, it is only necessary that leg 20' of return bend 20 be inserted downwardly into the upstanding neck portion 84 of the housing member 81 until the end of the leg 20' contacts ledge 94 on the metering member shank 93. Further downward movement of the return bend leg 20' forces the metering member 90 to completely open the adhesive flow cavity 95 in resistance to spring means 160, at which time the shoulders 83 and 91 on the housing member 81 and metering member 90 are spaced one from the other. Actuation of applicator nozzle 172 then forces flow of adhesive along the path shown to coat the lower end of the outer surface of the leg of the return bend, and when a slight amount of adhesive is noted in the region of the bead 85, the leg 20' is raised and plastic flow is shut off, as seen in the left-hand portion of FIG. 3. Alternatively, the return bend 20 may be located in a suitable fixture, and the mechanism M-2 caused to move in the desired vertical direction. After coating of one leg portion 20', the housing member 81 is caused to rotate about 90° by the gear and actuator arrangement, the plastic is thereby evenly wiped, and the next leg placed in position for coating.

The mechanism M-1 of FIGS. 4 and 5 operates in a generally similar manner. The tools T and coil 10 are movable vertically relative to one another, either of which can be stationary while the other is movable. In either case, when the dished collar 78 on the metering member shank 52 is forced against the flared inner surface on the bell mouth portion 22', the adhesive flow cavity 58 is opened for injection of adhesive therein, and when a minor amount of plastic is noted at the upper end of the bell mouth, or a timing sequence utilized, the tool T is rotated so that the plastic is wiped, the tool and coil unit separated, and thereby plastic flow is stopped by reason of the relative positioning of the metering and housing members as shown in the center portion of FIG. 4.

The coated parts are then assembled as in FIG. 2 and if desired, the wiping action may instead be performed at this point by individually twisting or rotating the return bend legs within the bell mouths. The assembled parts are then heat cured at about 250° F for approximately 2 hours, although of course the time-temperature cycle can be varied.

Tests performed on parts produced by this invention have revealed remarkable strength properties for the joint or bond therebetween, even exceeding significantly the strength properties of the tubular parts themselves. In fatigue testing, after assembly of the parts and curing of the plastic bond therebetween, a static load of about 200 lbs. is placed on the joint and also an additional 0-100 lb. dynamic load applied to the joint, the adhesive bond surrounded by a temperature of about 300° F and the assembly vibrated about 1,800 times per minute for approximately two million cycles. Parts produced by prior art techniques generally failed in this test, while a remarkably low percentage of failures were found when the instant teachings are followed. Likewise, the acceptable test tensile strength of 2,500 lbs. at the adhesive bond, which is five to six times greater than that of known aluminum tubes used for production applications, could only infrequently be met when using prior adhesive application techniques.

Epoxies of the character and properties earlier described herein are highly preferred at present, although other plastics may be found to be applicable. Variations in the precise application techniques have also been disclosed herein, and these and other changes may be practiced without departing from the spirit of this invention or the scope of the subjoined claims.

I claim:

1. Apparatus for applying an adhesive coating to a bell-shaped end portion of a tubular member, comprising an applicator tool which includes a housing member having a tubular shank portion terminating in an open end and a body portion connected to said shank portion and having adhesive discharge passages provided therein and an upwardly divergent shoulder portion and generally cylindrical head portion connected thereto; a metering member received in said housing member and complimentarily shaped on its exterior to define with the interior of said housing member a coaxial adhesive flow passage communicating at one end with an adhesive source and at its opposite end with said adhesive discharge passages in said housing member when said metering member and said housing members are positioned relative to one another for adhesive injection, said metering member having a nose portion engaging the interior of the bell-shaped end portion of said tubular member to close one end of said coaxial adhesive flow passage during injection of adhesive therein; a plug member stationarily disposed in said housing member head portion; resilient means bearing at opposite ends against said plug member and said metering member to close said coaxial adhesive flow passage by mating engagement of said housing member with said metering member after injection of the desired quantity of adhesive has been effected; means for supporting said applicator tool; means for supporting said tubular member; and means for moving said housing member and said metering member relative to one another and relative to said tubular member whereby during injection of adhesive said nose portion on one end of said metering member closes one end of said coaxial flow passage by bearing against said bell portion of said tubular member and when withdrawn from bearing position the action of said resilient means on said metering member closes the coaxial adhesive flow passage proximate to the opposite end thereof.

* * * * *